United States Patent [19]

Blackwelder et al.

[11] Patent Number: 4,697,769

[45] Date of Patent: Oct. 6, 1987

[54] METHOD AND APPARATUS FOR CONTROLLING BOUND VORTICES IN THE VICINITY OF LIFTING SURFACES

[75] Inventors: Ron F. Blackwelder, Palos Verdes, Calif.; Mohamed Gad-el-Hak, Federal Way; Randy A. Srnsky, Kent, both of Wash.

[73] Assignee: Flow Industries, Inc., Kent, Wash.

[21] Appl. No.: 603,097

[22] Filed: Apr. 23, 1984

[51] Int. Cl.$^4$ .............................................. B64C 23/06
[52] U.S. Cl. ..................................... 244/199; 244/207
[58] Field of Search .............. 244/198, 199, 201, 204, 244/207, 130; 114/67 R, 67 A

[56] References Cited

U.S. PATENT DOCUMENTS

| | | | |
|---|---|---|---|
| 2,783,008 | 2/1957 | Bodine, Jr. | 244/130 |
| 3,090,584 | 5/1963 | Kuchemann et al. | 244/199 |
| 3,774,867 | 11/1973 | Quinn | 244/130 |

FOREIGN PATENT DOCUMENTS 890418  2/1962  United Kingdom ................ 244/199

Primary Examiner—Jeffrey V. Nase
Assistant Examiner—Rodney Corl
Attorney, Agent, or Firm—Don R. Mollick; Gregory W. Moravan

[57] ABSTRACT

The lift generated by delta wings is due primarily to large vortices associated with the flow separation near the leading edge. The invention includes a perturbation device to control the separation shedding of those vortices and manipulate their frequency and pairing. This results in different growth rates of the vortices downstream of the device and thus the lift produced by the large bound vortices may be controlled. If the invention is applied to both leading edges, the total lift of the wing will be altered; if the perturbation is preferentially applied on only one side of the wing, the moment around the roll axis of the aircraft is controlled. A first embodiment uses a piston coupled to a cavity and slot to produce the desired perturbation. Alternative embodiments are described which achieve the results without moving parts.

8 Claims, 7 Drawing Figures

METHOD AND APPARATUS FOR CONTROLLING BOUND VORTICES IN THE VICINITY OF LIFTING SURFACES

This invention was made with Government support under Contract F49620-82-C0020 awarded by the U.S. Air Force. The U.S. Government has certain rights to this invention.

FIELD OF INVENTION

This invention pertains to lifting surfaces particularly controlling the lift of lifting surfaces, more particularly when such lifting surfaces are delta wing.

BACKGROUND OF INVENTION

In many engineering applications, a surface situated in a flow field is geometrically configured so that the flow induces a force on the surface; hence these configurations are called *lifting surfaces*. The most common examples are airplane wings, vanes on turbines and wind mills, and helicopter rotors. Under many operating conditions, the velocity near the lifting surface is approximately parallel to the surface and in the same direction as the mean flow field. When this is not true, regions of separated flow exist which are characterized by at least one point where a significant velocity component perpendicular to the surface exists. The present invention applies to these regions, but for simplicity the particular geometrical configuration discussed below is the delt wing. Similar applications exist for other geometries.

A delta wing 100 have a semi-vertex angle B and an angle of attack A is sketched in FIG. 1. Under usual operating conditions, the lift on such wings is due primarily to the large bound vortices (LBV) 101 which appear on the low pressure side of the wing. With straight line leading edges, only two LBVs will occur, however, more may be created by discontinuities in the leading edge or in the velocity along the edge. The LBVs are associated with a shear layer originating near the leading edge at the point of separation. This shear layer surrounds the vortices and may be considered as an integral part of the vortices 101 as shown in FIG. 2 which is a Section through 2—2. The sense of rotation of the vortices 101 is also shown. The strength and size of the shear layer and vortices 101 depends upon the velocity, angle of attack, swept back angle, configuration of the leading edge, etc. The lift on the wing depends, to a large extent, on the strength of these vortices 101.

Recent observations have shown that the shear layer in FIG. 2 is also composed of *discrete vortices* 103 which originate near the leading edge. They form at a discrete frequency dependent upon the mean velocity and the parameters effecting the thickness of the shear layer, and they grow by pairing with each other as they move downstream, much the same as in a mixing layer. The LBV 101 may be described as being composed of the collection of the individual vortices 103.

In lifting surfaces, it is desirable to control the lift of the surface for a number of reasons. For example, a fighter plane with variable lift would be able to attain an unusual degree of maneuverability. A number of devices have been proposed to control the lift of lifting surfaces by altering the large bound vortices 101. Such an approach requires the use of relatively large control surfaces such as flaps on the leading edge. Such devices have not met with wide spread adoption, however. It would be desirable to control lift by altering the discrete vortices 103.

A number of devices have been proposed to control the shedding of vortices at the leading edges of wings and other lifting surfaces. These include wings upstream of the leading edge, and various tabs and slots on the leading edge. None of these devices control the discrete vortex formation as a means of controlling bound vortices.

It has also been proposed to insert tuned cavities in the wing surface to control boundary layers, reduce noise or prevent stalling. Such devices are not intended to control discrete vortices. These devices have not met with commercial adoption.

SUMMARY OF THE INVENTION

The invention includes means and apparatus for manipulating the discrete vortices. The modulation of discrete vortices in turn allows control of the lift generated by a lifting surface. The control is preferably exercised at the leading edge of the lifting surface. While the invention is primarily intended for use with delta wing configurations, it could be used with any lifting surface.

A number of apparatus may be used to accomplish the method of the invention. In the simplest, a piston in a cylinder is coupled to the leading edge of the airfoil via a slot. The piston and cylinder form a cavity that has a natural resonance similar to the shedding rate of the discrete vortices. In a similar device, speakers are substituted for the piston. The slot can be eliminated and a piezoelectric array embedded in the airfoil to provide the disturbance. For low frequency applications, heating elements could be used to provide an unsteady perturbation. This method would be particularly suited to hydrofoils. Slots could also be added to the airfoil and fluid blown in or sucked out as an alternative method of producing perturbation. Finally, mechanical devices such as leading edge slots, flaps or similar devices could be used.

DESCRIPTION OF THE PREFERRED EMBODIMENT

Figure 3:
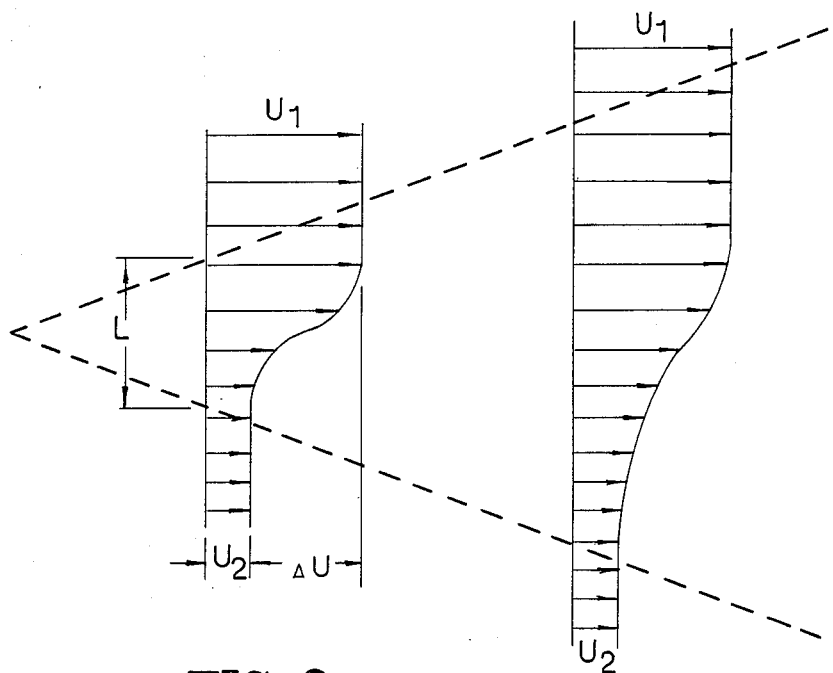
FIG. 3 is a side view of a shear layer.

FIG. 3 illustrates a shear layer or mixing layer. Such a layer occurs whenever the velocity within a flow field varies from one point in space to another. Shear layers commonly occur in connection with airfoils.

FIG. 3 defines the shear layer formed between layers of fluid having velocities $U_1$ and $U_2$, respectfully. The difference between the velocities is defined as $\Delta U$. The shear layer is further characterized by a length scale L. As we progress downstream from the point of virtual origin, it is apparent that L increases. The process by which this increase occurs is by formation and growth of vortices formed at the boundary of layers $U_1$ and $U_2$.

Figure 4:
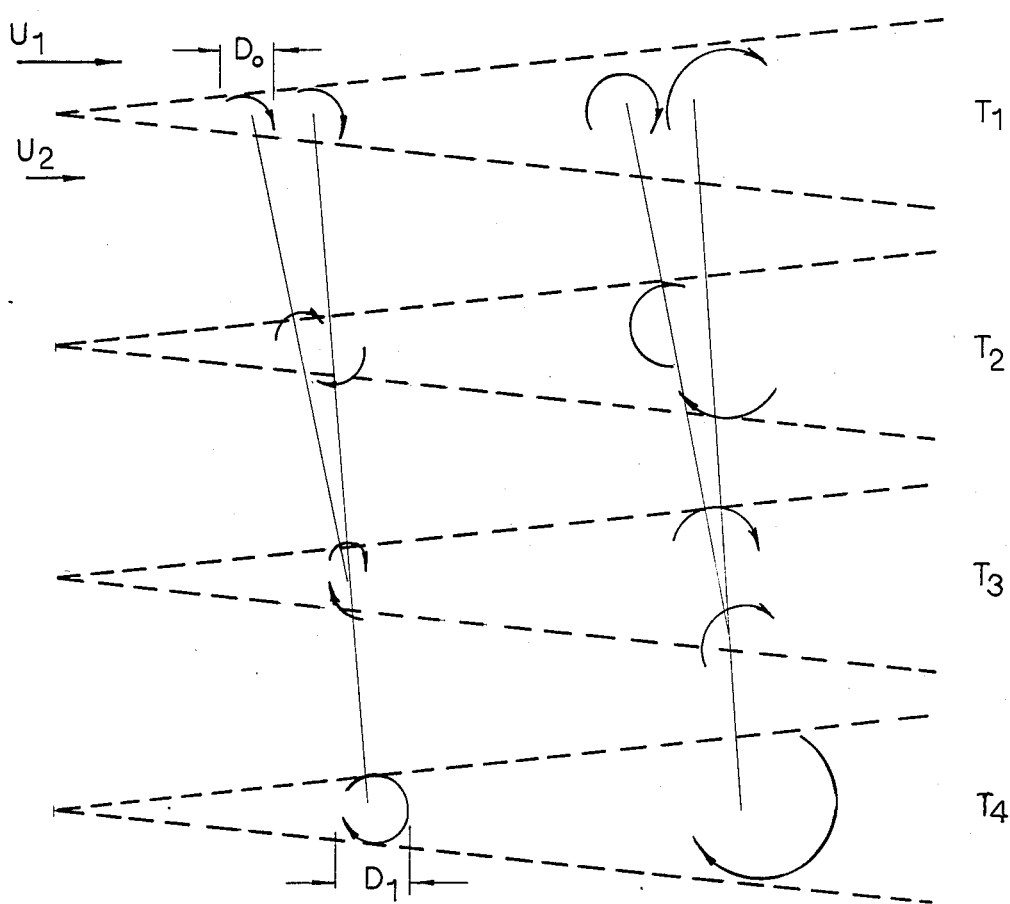
FIG. 4 is a side view illustrating the formation and pairing of the discrete vortices in a shear layer.

FIG. 4 illustrates the process of shear layer growth. The layers are defined as in FIG. 3. In FIG. 4, a shear layer is shown at four consecutive instants of time T1, T2, T3, and T4. The vortices have a diameter $D_o$ when formed. The velocity of the vortices is approximately $(U1+U2)/2$, or the mean velocity of the two layers. The individual vortices essentially do not grow but rather merge with neighboring vortices in a process called pairing. This pairing process is illustrated in FIG. 4. When the pairing process is completed, the result is a single vortex with a diameter D1. The diameter D1 is approximately the same as the length scale L.

Figure 1:
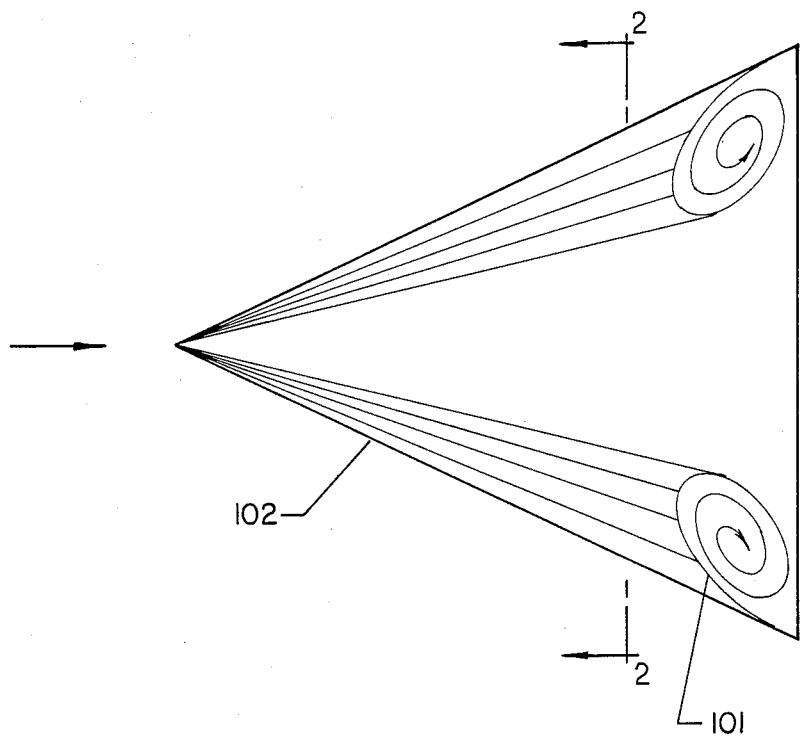
FIG. 1 is a perspective view of a delta wing illustrating the large bound vortices.
Figure 2:
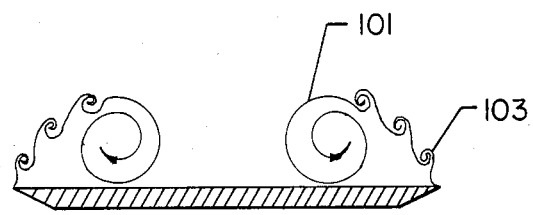
FIG. 2 is a section view through 2—2 of FIG. 1.

FIG. 2 illustrates that the processes described above are found in lifting surfaces, particularly those lifting surfaces known as delt wings. In such a wing, the lift is governed by the large bound vortices (LBV) which are formed through the process of pairing of the discrete vortices. The discrete vortices are produced in a shear layer that has the leading edge of the wing as its point of virtual origin. It therefore follows that by governing the formation of the discrete vortices, one can control the large bound vortices and in turn the lift of the lifting surface. It has been determined that the shedding frequency of vortices from a lifting surface is proportional to the square root of the velocity of the surface. For a lifting surface moving through water at a velocity of 80 cm/sec, a typical shedding frequency is 12 Hz. Similarly, at a typical velocity of a delta wing jet fighter of 600 m/sec, the shedding frequency is about 330 Hz. It is anticipated that perturbation of half the natural shedding rate (f/2) would increase the large bound vortices and the lift of the airfoil by as much as 100%. Similarly, perturbation at double the natural frequency of the shedding rate (2f) would lower the lift. Control of the lift at the surface would result in a lifting surface of unprecedented maneuverability. Since the lift could be altered asymmetrically i.e. on one side of the lifting surface, the invention also allows turning the wing around the roll axis by altering its lift asymmetrically.

Figure 5:
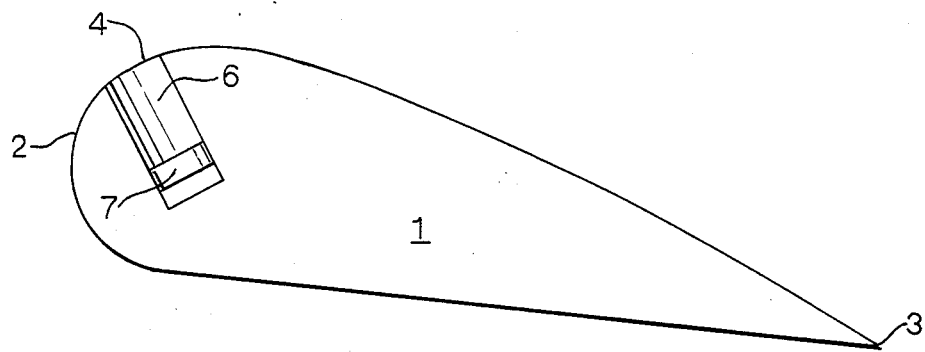
FIG. 5 is a section elevation view of the apparatus of the invention.

FIG. 5 illustrates a first apparatus for accomplishing the method described above. An airfoil having a leading edge 2 and a trailed edge 3 is shown. The shape of airfoil 1 is conventional. A slot 4 is located at leading edge 2 of airfoil 1. A cavity 6 is coupled to slot 4. Cavity 6 is tunable by a movable piston 7 located in cavity 6. Piston 7 may be moved by any conventional mechanical method. The size of cavity 6 is thus variable. Since cavity 6 has a natural resonant frequency, its location provides a method for altering the shedding rate of the discrete vortices. If, for example, the resonant frequency of cavity 6 is one-half the natural shedding rate, the result is an increase in the lift of airfoil 1. Similarly, if the resonant frequency of cavity 6 is twice the natural shedding rate, the lift will be decreased. Determination of the resonant frequency of cavity 6 may be made by formulae for acoustical resonance or by empirical methods.

Figure 6:
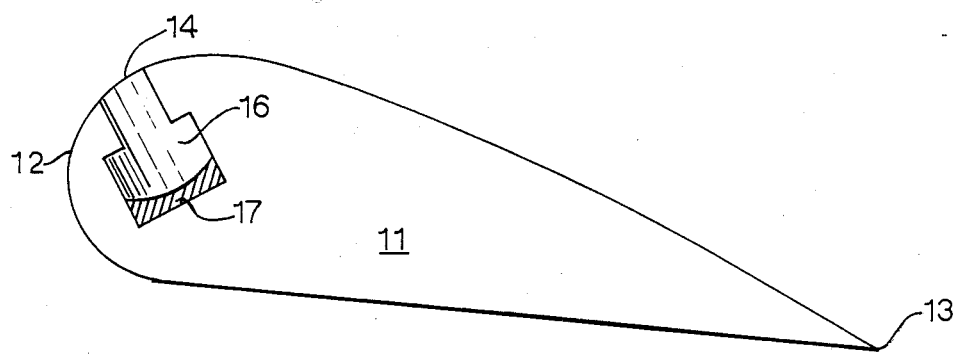
FIG. 6 is a section elevation view of a second embodiment of the apparatus of the invention.

FIG. 6 illustrates a second embodiment of the apparatus of the invention. In an airfoil 11 having a leading edge 12 and a trailing edge 13 is a cavity 16 coupled to a slot 14 located at leading edge 12. A speaker 17 is located in cavity 16. Speaker 17 could be an array of loudspeakers similar to those used in audio applications. Activation of speaker 17 at frequencies above or below the natural shedding rate provides a velocity perturbation at slot 14. This perturbation alters the lift characteristics in the manner described above. This method provides control without the use of moving parts.

Figure 7:
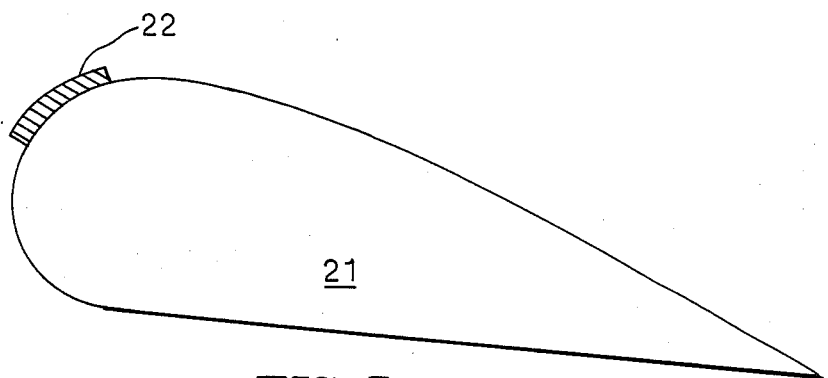
FIG. 7 is a section elevation view of a third embodiment of the apparatus of the invention.

FIG. 7 illustrates a third embodiment of the apparatus of the invention. In this embodiment, airfoil 21 is provided with a piezoelectric array 22 embedded in airfoil 21 at the leading edge. This device operates in a manner similar to that of the FIG. 6 embodiment. This method has the advantage that there are no slots subject to fouling.

Alternative methods of practicing the invention include blowing and sucking air through slots at the leading edge similar to slot 14 in the FIG. 6 embodiment.

In hydrofoil application, a heating element could be mounted at the leading edge to provide an unsteady perturbation to the flow before separation. This method would be most useful when the natural shedding frequency is relatively low.

The embodiments shown are illustrative only. The scope of the invention being defined by the claims only.

What is claimed is:

1. A method for controlling bound vortices on lifting surfaces in a field of flowing fluid comprising the steps of:
    perturbing the shedding of discrete vortices at the leading edge of said lifting surfaces by
    producing a regular periodic flow of fluid at the leading edge of the lifting surfaces wherein the frequency of said flow of fluid is about twice the shedding frequency resulting in a decrease in lift; and
    controlling the period of such flow relative to the shedding velocity of discrete vortices generated by shear flow over said lifting surfaces; and
    continuing perturbation.

2. The method of claim 1 wherein the frequency of said flow of fluid is less than the shedding frequency, resulting in an increase in lift.

3. The method of claim 2 wherein the frequency of said flow of fluid is about one-half the shedding frequency.

4. The method of claim 1 wherein the step of producing a regular flow of fluid is further comprising of the steps of:
    generating acoustical energy at the leading edge of the lifting surface.

5. A method for altering the lift of a lifting surface comprising the steps of:
    producing a periodic flow to perturb the shedding of discrete vortices wherein a greater flow period than the shedding period increases lift and a lesser flow period than the shedding period decreases lift; and,
    continuing the production until the desired lift is obtained.

6. The method of claim 5 wherein said production step is accomplished by use of a resonant cavity.

7. The method of claim 5 wherein said production step is accomplished by use of a speaker and generator of periodic electric current.

8. The method of claim 5 wherein said production step is accomplished by use of a piezo electric device.

* * * * *